United States Patent [19]

Nowobilski et al.

[11] Patent Number: 4,749,384

[45] Date of Patent: Jun. 7, 1988

[54] METHOD AND APPARATUS FOR QUICK FILLING GAS CYLINDERS

[75] Inventors: Jeffert J. Nowobilski, Orchard Park; Frank Notaro, Amherst; Arun Acharya, East Amherst, all of N.Y.

[73] Assignee: Union Carbide Corporation, Danbury, Conn.

[21] Appl. No.: 42,348

[22] Filed: Apr. 24, 1987

[51] Int. Cl.[4] .................... B01D 53/04

[52] U.S. Cl. .................... 55/27; 55/74; 55/267; 55/387; 123/527

[58] Field of Search .................... 48/179, 190; 55/27, 55/74, 267, 387; 123/525–527; 141/1, 4–7, 11, 12, 37, 44, 69, 71, 85

[56] References Cited

U.S. PATENT DOCUMENTS

| | | | |
|---|---|---|---|
| 2,508,821 | 5/1950 | Gammill, Jr. | 55/27 X |
| 2,663,626 | 12/1953 | Spangler | 55/74 X |
| 2,712,730 | 7/1955 | Spangler | 62/1 |
| 3,323,288 | 6/1967 | Cheung et al. | 55/58 |
| 3,565,201 | 2/1971 | Petsinger | 62/52 X |
| 3,738,084 | 6/1973 | Simonet et al. | 55/31 |
| 3,789,820 | 2/1974 | Douglas et al. . | |
| 4,495,900 | 1/1985 | Stockmeyer . | |
| 4,501,253 | 2/1985 | Gerstmann et al. | 123/527 |
| 4,522,159 | 6/1985 | Engel et al. | 123/527 X |
| 4,523,548 | 6/1985 | Engel et al. | 123/527 X |
| 4,531,558 | 7/1985 | Engel et al. | 123/525 X |
| 4,566,281 | 1/1986 | Sandrock et al. | 55/74 X |

*Primary Examiner*—Robert Spitzer

*Attorney, Agent, or Firm*—Alvin H. Fritschler

[57] ABSTRACT

A method and apparatus for quick-filling a full charge of compressed natural gas into an adsorbent filled cylinder.

7 Claims, 6 Drawing Sheets

QUICK FILL SYSTEM

Calculated Dependence of Bed Temperature vs. Time with Quick Fill System

Inlet Gas Temp.: −7°C  Carbon $C_P$ = 59 BTU / lb°F

Maximum Bed Temp.: 104.4°C  Charge : 100%

Gas Velocity : 6.1 meters/min  Particle Dia.: .194"

Calculated Average Bed Temperature
vs Time During Quick Fill

Calculated Effect of Inlet Gas Temperature on Fill Time

METHOD AND APPARATUS FOR QUICK FILLING GAS CYLINDERS

FIELD OF THE INVENTION

This invention pertains to the method in which adsorbent filled containers, e.g. cylinders in a vehicle, can be quick filled with a gas, e.g. natural gas, within a short time period, e.g. of from 5 to 10 minutes. The quick fill system provides a unique means for the removal of the heat of adsorption released when the natural gas is adsorbed onto the adsorbent, consisting of a system to recirculate the methane through a chiller and reintroduce the cooled gas into the adsorbent filled container or cylinder. The hot natural gas is removed from the back of the container or cylinder, passed through a blower, then through an air cooled heat exchanger and through a chiller. The gas is cooled to approximately 5° C. and reintroduced into the front end of the adsorbent filled vehicle cylinder. Recirculation of the gas at the proper flow rate will result in the vehicle cylinder reaching its fully charged state in a 5 to 10 minute time period.

DESCRIPTION OF THE PRIOR ART

U.S. Pat. No. 2,663,626; Spanqler; Method of Storing Gases; issued Dec. 22, 1953.

This patent discloses a method of natural gas peak shaving using cold gas storage on an insulated adsorbent filled vessel. The system involves drawing natural gas from a pipeline. The natural gas is passed through a purification plant to remove any contaminants such as moisture, carbon oxides, hydrogen sulfide, or other acid gases. The gas is then compressed and heat exchanged and passed through refrigeration apparatus at temperatures of from about −160° C. to about −147° C. wherein the methane is chilled almost to its liquefaction temperature and conducted through a conduit to the adsorbent filled container wherein the methane cools the adsorbent bed and by continuous recirculating eventually becomes adsorbed on the bed itself. The purpose of the recirculating gas is to cool the adsorbent bed and thereby increase its loading such that a substantial amount of methane can be stored within the vessel. The system involves controlled refrigeration so that the adsorbent bed is cooled as near to the liquefaction temperature as possible in order to enhance adsorbent storage capability. This cooling of the adsorbent bed is accomplished by recirculation of the chilled natural gas itself which is eventually stored on the adsorbent. During withdrawal of natural gas from the storage system, a heater can be used to supply necessary heat to drive the methane from the adsorbent vessel.

U.S. Pat. No. 2,712.730; Spangler; Method of and Apparatus for Storing Gases; issued July 12, 1955.

This patent is directed towards peak shaving storage of natural gas from a pipeline wherein a cold insulated adsorbent vessel is used to contain the gas. The improvement by Spangler involves the refrigeration of the natural gas so that it is liquefied and the use of this liquid methane to refrigerate the adsorbent bed. The improvement associated with this arrangement is the reduction in the amount of natural gas required to refrigerate the adsorbent bed and the containment of a constant low temperature equivalent to the liquefaction temperature of the natural gas. It should be noted that the intent of this system is to use the liquid methane to cool the adsorbent but the subsequent storage of the natural gas is essentially at vapor conditions so that energy associated with the liquefaction of the stored gas is avoided. During gas withdrawal, the arrangement allows for input of heat to drive off the adsorbed gas.

U.S. Pat. No. 3,323,288; Cheung, et al.; Selective Adsorption Process and Apparatus; issued June 6, 1967.

This patent discusses the negative factors associated with the heats of adsorption and desorption in terms of reducing system capacity. A method is disclosed that involves dual beds with a common wall so that the heat of adsorption from the first bed can be used to regenerate the second bed and thereby take advantage of the heat flow. The patent does not involve heat transfer to the ambient surroundings. The patent requires at least two fixed selective adsorption zones of equal heat transfer capacity in direct end-to-end thermal association with each other coextensively in the longitudinal direction. It alleges separation of fluid mixtures by selective adsorption and desorption at low temperature differences. There is no mention or discussion of fuel loading an adsorbent filled gas storage cylinder.

U.S. Pat. No. 3,565,201; Petsinqer; Cryogenic Fuel System for Land Vehicle Power Plant; issued Feb. 23, 1971.

This patent describes a fuel system for an automobile wherein liquified natural gas is stored in the vehicle and an arrangement allows draw of that liquid through the engine air cleaner to vaporize the fuel and supply it to the engine. This describes an alternate means to supply natural gas from the compressed natural gas storage system to the power plant of the vehicle. There is no mention or discussion of fuel loading an adsorbent filled gas storage cylinder.

U.S. Pat. No. 3,738,084; Simonet, et al.; Adsorption Process and Installation Thereof; issued June 12, 1973.

This patent describes an adsorption system for purifying a gas, e.g. air, of water and carbon dioxide. The arrangement includes the usual adiabatic cleanup of the air feed but a staged regeneration sequence. The dual bed includes a carbon dioxide section for removal of the carbon dioxide, which is heated by means such as imbedded electric heaters, and a water section for removal of the moisture, which is cooled by imbedded coils for cooling water or other refrigerant. The regeneration sequence includes heating, purging, and cooling of the sections to improve energy usage for cleaning the adsorbent beds.

The patent shows the use of imbedded electric heaters and cooling coils for heat transfer in an adsorbent bed. There is no mention or discussion of fuel loading an adsorbent filled gas storage cylinder.

U.S. Pat. No. 3,789,820; Douglas, et al.; Compressed Gaseous Fuel System; issued Feb. 15, 1974.

This patent describes a fuel system modification for a motor vehicle wherein the natural gas is stored in high pressure storage vessels. The arrangement involves placing the high pressure vessels outside the passenger compartment and includes associated piping and pressure regulators for supplying the compressed natural gas at low pressure to the engine. There is no mention or discussion of fuel loading an adsorbent filled gas storage cylinder.

U.S. Pat. No. 4,495,900; Stockmeyer; Methane Storage for Methane Powered Vehicles; issued Jan. 29, 1985.

This patent discloses a fuel system modification that uses adsorbent filled vessels to contain compressed natural gas. The adsorbent involves a special molecular sieve powder compacted to a density of 0.7 gram per cubic centimeter and involves relatively low pressure storage at a pressure of less than 15 bars or preferably 10 bars (225 to 150 psia). The patent discloses and recommends the use of specially shaped rods or bars of adsorbent material in order to completely fill the shape of the storage vessel and best utilize the space within the vessel. Additionally the system describes the use of a microprocessor to control the withdrawal of the compressed natural gas to the engine as needed. The withdrawal makes allowance for the use of radiator heat in order to drive the compressed natural gas from the storage vessel. There is no mention or discussion of fuel loading an adsorbent filled gas storage cylinder.

SUMMARY OF THE INVENTION

This invention pertains to an apparatus and a method for quick-filling a full charge of natural gas into an adsorbent filled cylinder for use in compressed natural gas powered vehicles in a time period that is commercially acceptable. In this application the words natural gas and methane are used synonymously. Further, the apparatus and method are not limited to adsorbent filled cylinders on vehicles but can be used for any adsorbent filled cylinder. Generally the apparatus and method of this invention will place a full charge of the natural gas into the adsorbent filled cylinder of a gas powered vehicle in a time period of about 5 to 10 minutes.

SPECIFIC DESCRIPTION

Figure 1:
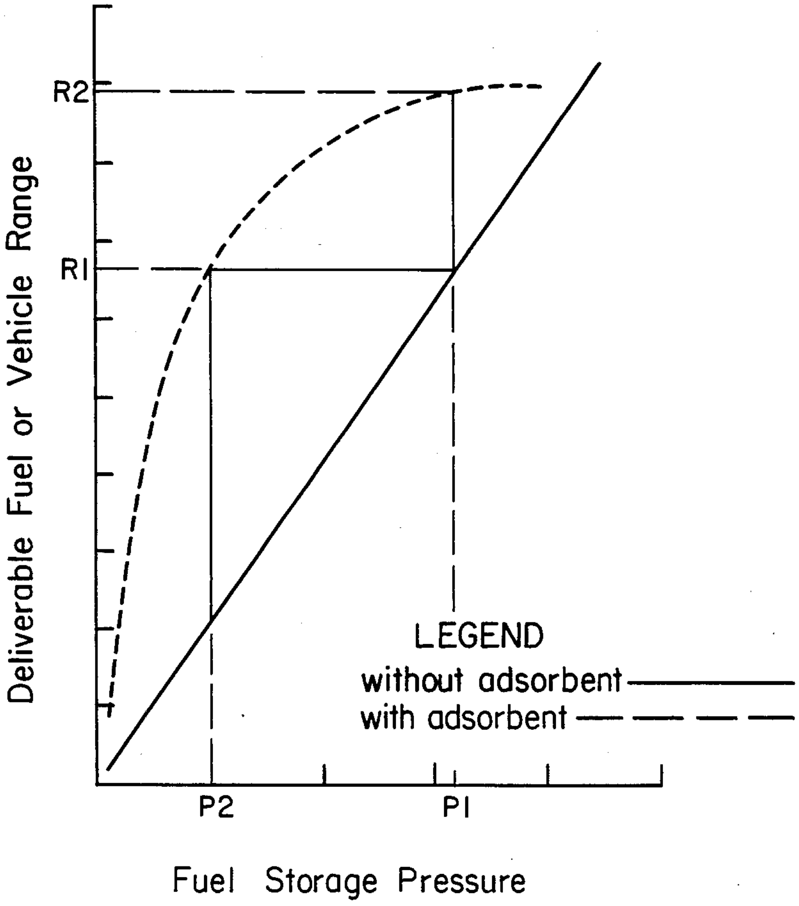
FIG. 1 diagrammatically illustrates the increased vehicle range achievable with the use of an adsorbent filled fuel storage cylinder versus a cylinder without adsorbent.

In this invention one of the significant problems associated with the use of natural gas or methane in the propulsion of automotive vehicles is alleviated. This problem is that of placing a full charge into the adsorbent filled storage cylinder within a reasonable period of time.

The use of natural gas in the propulsion of motor vehicles is well-known. Natural gas powered vehicles, in general, provide advantages over gasoline powered or diesel powered vehicles in that they are inherently cleaner with lower nitrogen oxide and hydrocarbons emissions. A particular problem, however, is encountered in filling the gas storage cylinder. The gas storage cylinders are generally filled with an adsorbent which permits increased gas storage at a lower pressure than would be required in the absence of the adsorbent. Among the well-known adsorbents used are clay, attapulgite, fullers earth, activated carbons and charcoals, bauxites, aluminas, calcium sulfate, silica and alumina gels, the zeolites, etc. The use of adsorbent filled cylinders in motor vehicles and the adsorbents themselves are fully and amply described in the references described above; such cylinders and adsorbents being commercially available.

A problem encountered in any gas adsorptive storage system is dissipating the heat generated due to the adsorption of the gas onto the adsorbent. If this heat dissipation or removal is not carried out, the storage capacity is reduced significantly due to the elevated temperature of the adsorbent. This can become a severe problem when an adsorbent filled cylinder is fast filled. For a total charge to be placed into the average adsorbent filled motor vehicle cylinder in a time period of five to ten minutes, it will be necessary to remove about 40,000 Btu of heat. If the heat is not removed during the filling time the vehicle range is significantly reduced since the cylinders do not have a full charge at ambient temperature. One way of overcoming this would be to add more cylinders to the vehicle to compensate for the reduced gas storage capacity and thus give the vehicle a longer range. This problem of removal of heat of adsorption is not as severe in a slow fill operation. In a slow fill process carried out over a sixteen-hour period, as compared to a quick fill of a few minutes by the process of this invention, the heat of adsorption can be normally dissipated through conduction out of the cylinder. However, such long filling times are commercially unacceptable for automotive applications in general. To be commercially acceptable, natural gas powered motor vehicles will have to have near-similar performance features as the public is accustomed to with gasoline and diesel powered vehicles. Features such as the range of the vehicle, the refueling time, the safety, and the storage volume in the vehicle for the fuel.

The major advantage of the method and apparatus of this invention is the unexpected and unpredicted ability to place a full charge of natural gas into the adsorbent filled cylinder at an acceptable pressure at near ambient temperature in a short period of time comparable to that for filling a standard gasoline or diesel tank.

In a typical embodiment of this invention the motor vehicle 8 will enter the fill station and connect inlet 9 of adsorbent filled gas storage cylinder 7 to fill line 6 and outlet 10 to withdrawal line 11. The fill line 6 and withdrawal line 11 could be incorporated into a single keyed connection allowing the gas to enter and leave the connection through a single fitting on the vehicle 8. The cylinder 7, which is to be refueled, is assumed to be at a low pressure, e.g. 10 psig, and at approximately ambient temperature, e.g. 21° C. Under some circumstances, different pressures and temperatures may prevail. For example, if the motor vehicle enters the fill station after driving for some time and has a half full cylinder 7 the temperature in the cylinder 7 would be somewhat below ambient due to cooling resulting from the heat of desorption as the natural gas is withdrawn from cylinder 7 and the pressure in cylinder 7 would be reduced to somewhere around 250 psig. These values will vary depending on the amount of fuel in cylinder 7 at the time and the conditions under which the vehicle was operated, which affect the rate of fuel withdrawal.

Assuming a cylinder 7 pressure of 10 psig and an approximate ambient temperature of 21° C., after cylinder 7 is connected to fill line 6 and withdrawal line 11 the fill cycle is initiated through a start button or a key switch or suitable means, all of which are known and used in this art. Upon commencement of fill, the pressure in cylinder 7 quickly increases to the preselected pressure of 500 psig through compressor 2 discharge and Cascade cylinders 5 discharge, both set at about 600 psig, and the temperature of the adsorbent and the gas in cylinder 7 quickly increases adiabatically from ambient to anywhere from about 90° C. to about 250° C.

As the cylinder 7 is being pressurized the gas recirculation and gas cooling systems are also started. This begins to recirculate the gas through the cylinder 7 causing hot gas to be withdrawn and cooled gas to be returned to the cylinder 7. The hot gas is withdrawn from cylinder 7 through outlet 10 and conducted by withdrawal line 11 and passed through blower 12 and air cooled heat exchanger 13. This generally reduces the temperature of the gas to about 5° C. to 20° C. above the ambient temperature. This partially cooled gas is then passed through chiller 14 where it is further cooled to about 5° C. and recycled to cylinder 7 via line 15, line 4, fill line 6 and inlet 9. Superficial velocities of the recirculation gas range from about 2 to about 60 feet per minute based on the full cross section of the cylinder. Generally the typical superficial gas velocity can be from about 10 to about 20 feet per minute. Recirculation is continued until a full charge has been placed in the cylinder 7 at average ambient temperature.

Figure 3:
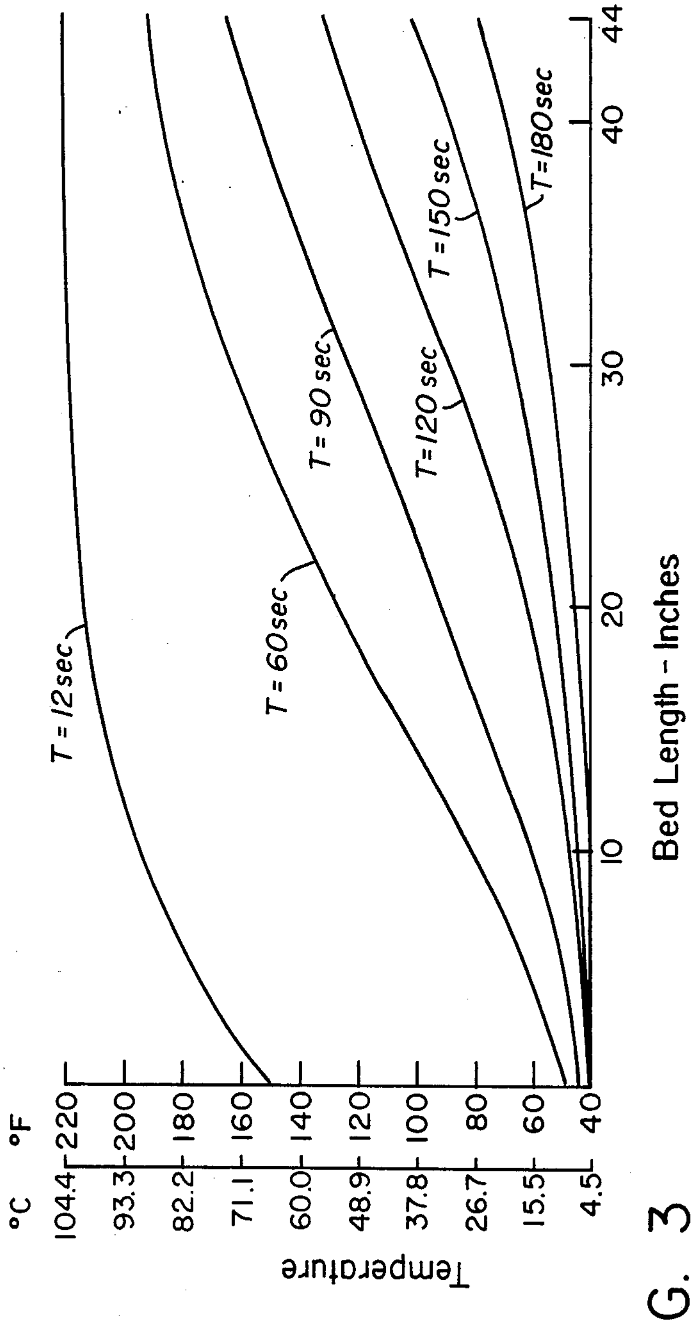
FIG. 3 is a graph plotting the calculated dependence of the bed temperature as a function of time.

The determination of the end of fill on a quick fill of an adsorbent filled cylinder 7 is not straightforward since a temperature gradient exists along the length of the bed as shown in FIG. 3. That is, the front of the adsorbent bed will be cooled very quickly to the inlet gas temperature stream while the back or exit section of the adsorbent bed will remain quite hot. As the quick fill progresses, the temperature at the back of the adsorbent bed falls slowly while the temperature at intermediate points of the adsorbent bed fall more rapidly. If the fill is carried on for too long a period of time the average bed temperature will be lower than the ambient temperature. This will cause an over pressurization of the cylinder 7 as the adsorbent and natural gas warms to ambient temperature. If the fill is carried on for too short a period of time the average bed temperature will be above the ambient temperature. This will result in underfilling of the cylinder 7 as the adsorbent and natural gas cools to ambient temperature.

Termination of the quick fill operation is determined by measuring the exit gas temperature at outlet 10, which should be from about 35° C. to about 95° C., while the inlet gas temperature at inlet 9 is at about 5° C. When the exit gas temperature reaches the recited temperature conditions, the average adsorbent bed temperature will be approximately at the ambient temperature. Thus, when the adsorbent bed equalizes in temperature the average pressure in cylinder 7 will be at its design level of about 500 psig. Conducting the fill in the manner described achieves a quick fill of a full charge in an adsorbent filled cylinder in a period of time which is approximately the same as a gasoline or diesel powered vehicle.

The adsorbent bed can be of any desired configuration, a solid monolith, discs, particulates, blocks, etc., many of which are commercially available. When using particulates, these can be either pellets, beads, granulars, chunks, powders, or any other particulate form. Discs or blocks of various thickness and size to fill the cylinder can also be used. The preferred embodiment of the adsorbent bed is a solid monolith that essentially fills the cylinder. It would have the highest packing density of any other adsorbent configuration and thus store more natural gas in the cylinder. The solid monolith can be produced, as is known, with the proper size and number of passages to provide good heat and mass transfer.

Where multiple cylinders 7 are used in a single vehicle either a series or a parallel interconnecting arrangement will be required. The interconnecting arrangement of cylinders 7 will depend on the size of the adsorbent beds and the desired fill time of the vehicle 8. At a fixed bed superficial velocity, a series connection configuration of multiple cylinders 7 will lengthen the fill time, result in higher exit gas temperatures and will thus utilize the air cooled heat exchanger more effectively. This is due to the longer length of the bed and resulting closer approach temperature between the gas and the adsorbent.

The preferred adsorbent bed gas flow path is such that the gas enters one end and is withdrawn from the opposite end of the cylinder 7. This results in the most efficient use of the gas, with a close gas to adsorbent bed approach temperature. Other gas flow configurations could be utilized such as a radial flow through the bed in which the gas enters a center inlet tube and is distributed throughout the length of the bed and then flows radially out to the outer walls. The gas is collected along the outer wall and then flows out of the cylinder through the other end or the same end through a coaxial inlet-outlet arrangement. A coaxial entrance and exit could also be used in a single longitudinal flow through the bed by entering the cold gas through a central tube down to a bottom header and then allowing the cold gas to flow up through the bed. The gas is collected in a top header and exits the same end of the bed through the outer portions of a coaxial nozzle.

The coaxial flow arrangement may be able to save vehicle space by having a single nozzle arrangement on the cylinder 7. The drawbacks of this arrangement are complications in the cylinder 7 due to the entrance and exit headers required and some lost volume due to the central flow tube required for the gas to reach the opposite end of the cylinder 7.

A parallel flow configuration will decrease the fill time while increasing the recirculation gas mass flow rate and increasing the temperature difference between the gas and the bed. This results in a less efficient use of the natural gas recirculation. The optimum flow bed configuration will be determined by the vehicle storage tanks and the requirement for the fill time and overall costs of the system.

Referring to FIG. 1, it is seen that at a given fuel storage pressure, P1, the vehicle range of a vehicle equipped with a gas fuel storage cylinder that does not contain the gas adsorbent is R1; at the same fuel storage pressure, the vehicle range of the vehicle equipped with an adsorbent filled fuel storage cylinder is R2, the increased distance or range being the difference between R1 and R2. Similar results are observed at different fuel storage pressure loadings, with a lower pressure loading of P2 also illustrated in FIG. 1. The difference at intermediate fuel storage pressures can be readily ascertained.

FIG. 1 shows use of an adsorbent filled cylinder can give increased gas storage at the same cylinder pressure compared to a compressed gas cylinder that does not contain the adsorbent, or the same gas storage at a lower pressure.

Figure 2:
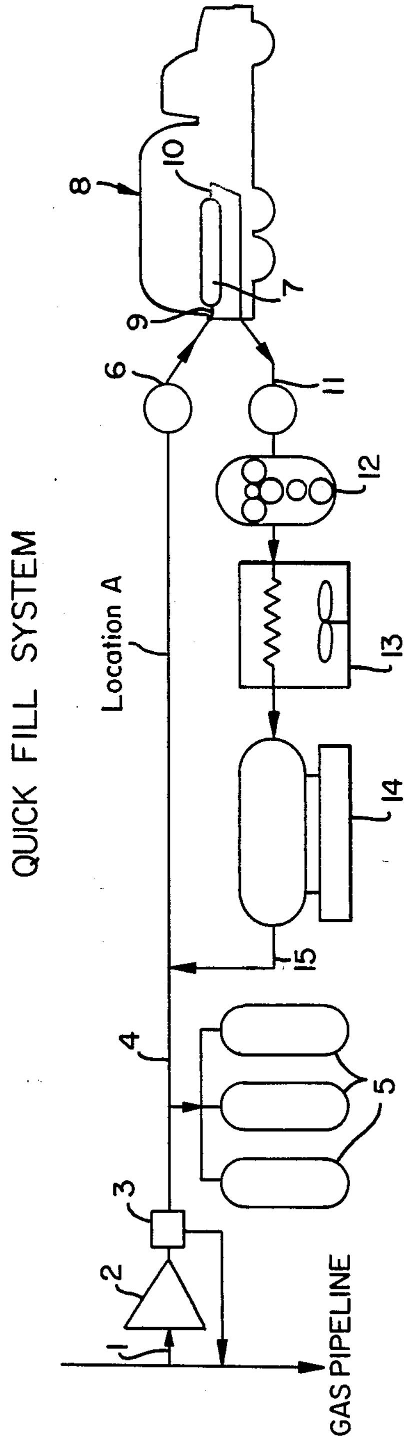
FIG. 2 is a schematic diagram of the quick fill system.

Referring to FIG. 2, the quick fill apparatus or system is shown in schematic diagram. The natural gas is brought into the quick fill system from line 1 passed through a compressor 2 that is sized to fill the required number of vehicles per day; these are commercially available in requisite sizes or can be constructed to satisfy the need. The gas passes through a purification system 3 in which vapor phase moisture together with any possible carbon dioxide, hydrogen sulfide, or other contaminant gases which may be present in the main gas supply are effectively removed. After purification the gas passes through line 4 either into the storage Cascade cylinders 5 which are sized to allow the compressor 2 to run continuously during the filling station operating hours or through fill line 6, which is suitably valved, into adsorbent filled gas storage cylinder 7 situated in natural gas powered vehicle 8. The gas enters adsorbent filled gas storage cylinder 7 through inlet 9 and exits through outlet 10 through withdrawal line 11, which is suitably valved, and passed through blower 12 which is used to circulate the gas through the system and an air cooled heat exchanger 13. The cooled gas enters the up-stream section of chiller 14 in which it is further cooled then exits the down-stream section and passes through line 15 from whence it is reintroduced to line 4 for recycle to adsorbent filled gas storage cylinder 7. Optionally, chiller 14 can be situated at Location A on line 4 or a second chiller may be added there. Further, the position of blower 12 can be moved to the exit side of air cooled heat exchanger 13 or to the down-stream side of chiller 14.

Other embodiments of the quick fill system shown in FIG. 2 can be used, as would be apparent to one skilled in the art; however, such embodiments are not necessarily to be considered outside the scope of this invention.

The data plotted in FIG. 3 to FIG. 6 was calculated using the equations presented by C. C. Furnace in an article entitled "Heat Transfer From a Gas Stream to a Bed of Broken Solids", Trans. Amer. Inst. of Chem. Eng., Volume 24, 1942, (1930).

Referring to FIG. 3, this illustrates in graphic form the calculated temperature history of a specific carbon adsorbent bed upon filling a cylinder by the process of this invention. The recirculation of the natural gas stream is assumed to be at 5° C. (40° F.) and the bed length at 109.2 cm. The carbon bed heats to about 105° C. (220° F.) due to the heat released as the natural gas is initially adsorbed onto the adsorbent as the bed is pressurized to 500 psi. The cooling starts with this initial pressurization. The cooling curve at any time along the adsorbent bed length is shown at times equal to 12 seconds, 60 seconds, 90 seconds, 120 seconds, 150 seconds and 180 seconds. The adsorbent filled cylinder is safely filled and fill termination is carried out at t=120 seconds, at which point the area above the 21° C. (70° F.) line is egual to the area below the 21° C. line. This assures that when the bed equalizes in temperature to 21° C. the pressure in the adsorbent filled cylinder will remain at about 500 psig, assuming a linear adsorption process in this temperature range.

Considering the data in FIG. 3, if fill termination is carried out at t=60 seconds or t=90 seconds, the area above the 21° C. line and the temperature curve is more than the area below the 21° C. line. When the bed equalizes in temperature above 21° C. the pressure in the adsorbent filled cylinder will drop to below 500 psig indicating the cylinder was not completely filled. Conversely, at t=150 seconds or t=180 seconds, the area above the 21° C. line and the temperature curve is less than the area below the 21° C. line. Under this situation when the bed equalizes in temperature to 21° C. the pressure in the adsorbent filled cylinder will rise to above 500 psig indicating the cylinder was overfilled and may pose a safety hazard due to the higher pressure in the cylinder.

The quick fill method of this invention will generally result in a full charge of natural gas being placed into an adsorbent filled gas cylinder of a vehicle in about a 5 to 10 minute period that will equalize under ambient temperature conditions (assumed to be 70° F. or 21° C.) to an acceptable pressure. This is considered a reasonable filling time for the natural gas to be competitive with gasoline from the convenience standpoint. Without the quick fill method of this invention, it could take as much as about 24 hours to dissipate the heat from the adsorbent bed and place a full charge in the vehicle.

In FIG. 3 at time t=0, it is assumed the adsorbent quickly reaches a temperature of 105° C. As the chilled gas continues to enter the bed, the front end of the adsorbent bed is rapidly cooled to the inlet gas temperature while the back end of the adsorbent bed remains hot, as shown by the curve at t=12 seconds. As introduction of chilled gas continues, cooling proceeds in the adsorbent bed and the back of the adsorbent bed slowly decreases in temperature while more and more of the preceding portions of the adsorbent bed reach the inlet gas temperature, as shown by the curves for the other t values in FIG. 3.

Figure 4:
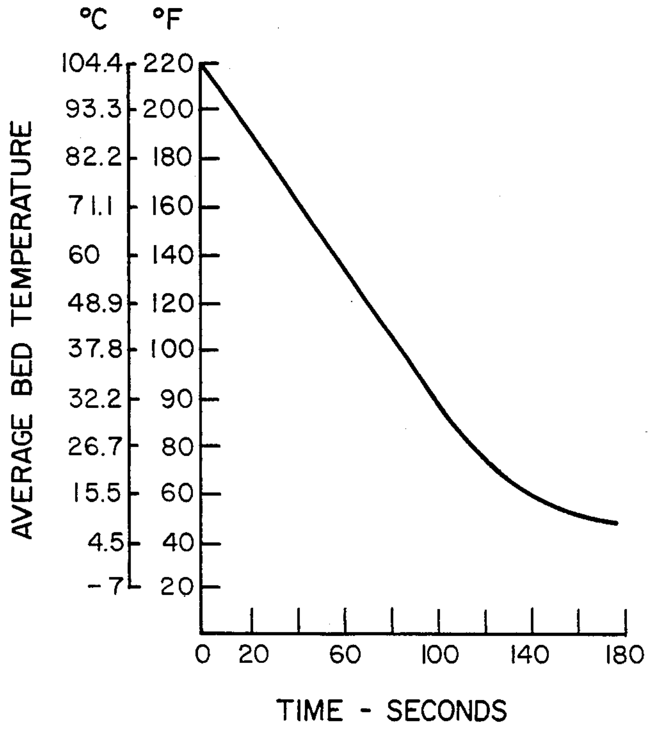
FIG. 4 is a graph plotting the calculated average bed temperature as a function of time during a quick fill operation.

Referring to FIG. 4, this illustrates in graphic form the calculated average bed temperature as cooling proceeds during the quick fill operation; it shows a decrease in the average bed temperature as the operation proceeds. The data in this FIG. 4 corresponds to the average bed temperature based on the curves from FIG. 3. If the adsorbent bed is to be filled with natural gas to the capacity based on an average assumed ambient temperature of 21° C. (70° F.), FIG. 4 clearly shows that not cooling the bed for a sufficient period of time with chilled gas will result in an average adsorbent bed temperature qreater than 21° C. This corresponds to not placing a full charge into the vehicle's adsorbent filled gas storage cylinder. On the other hand, if the bed is cooled for an extended period of time, the average adsorbent bed temperature will be below 21° C. This corresponds to overfilling the gas storage cylinder.

In not cooling the bed for a long enough period of time, the average adsorbent bed temperature in the cylinder can be substantially greater than the ambient temperature, which is assumed to be 21° C. As the adsorbent bed cools to the ambient temperature, and the temperature difference between the hot and cold ends equalizes, the pressure will fall below the desired design pressure of 500 psig. The under cooling case is shown in FIG. 3 the curve T=90 seconds and FIG. 4 the point T=90 seconds and an average adsorbent bed temperature of 43.3° C. (110° F.). This would result in a loss of vehicle range since the tank is not totally filled. In allowing the cooling to proceed longer than the correct amount of time the average adsorbent bed temperature is reduced below the 21° C. ambient, in this case as the adsorbent bed temperature equalizes to the 21° C. ambient, the pressure will increase above the 500 psig design point. This will cause gas to be released out of the safety relief device. This is shown in FIG. 3 curve T=180 seconds and FIG. 4 the point T=180 seconds, $T_{avg}$=10° C. In this case over cooling of the bed results in a waste of natural gas through fuel which is vented out of the container and the possibility of causing a safety hazard of venting the gas into an enclosed space.

Figure 5:
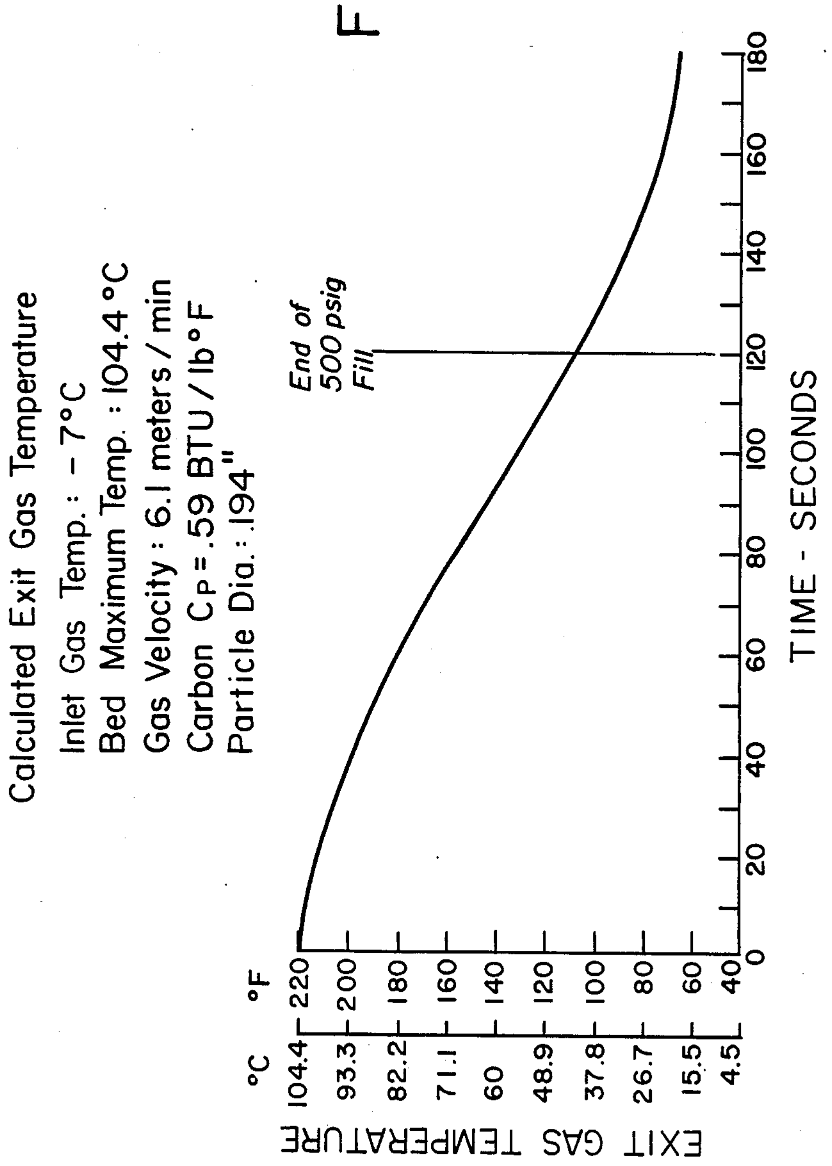
FIG. 5 is a graph plotting the calculated exit gas temperature vs. time.

Referring to FIG. 5, this illustrates in graphic form the calculated exit gas temperature for a given adsorbent filled cylinder described, based on an assumed ambient temperature of 21° C. The filling procedure should be controlled so that the fill is terminated at the correct time so that the average bed temperature will result in the design pressure being achieved at ambient bed temperature. That is, the same amount of gas should be placed in the tank with a non-uniform adsorbent temperature as would fill the tank under an equilibrium temperature of 21° C. and 500 psig. This avoids the adsorbent filled container being either overfilled and venting natural gas or underfilled and reducing the vehicle range. This can be carried out by monitoring the exit gas temperature from the cylinder, as shown in FIG. 5. The exit gas temperature corresponds uniquely to a given average adsorbent bed temperature. The control system can monitor the exit gas temperature and terminate the fill at the point where the exit gas temperature corresponds to an average adsorbent bed temperature of 21° C. This will provide a reasonably reliable, safe and effective means of the fill at the correct time and neither overfilling or underfilling the adsorbent filled cylinders.

Figure 6:
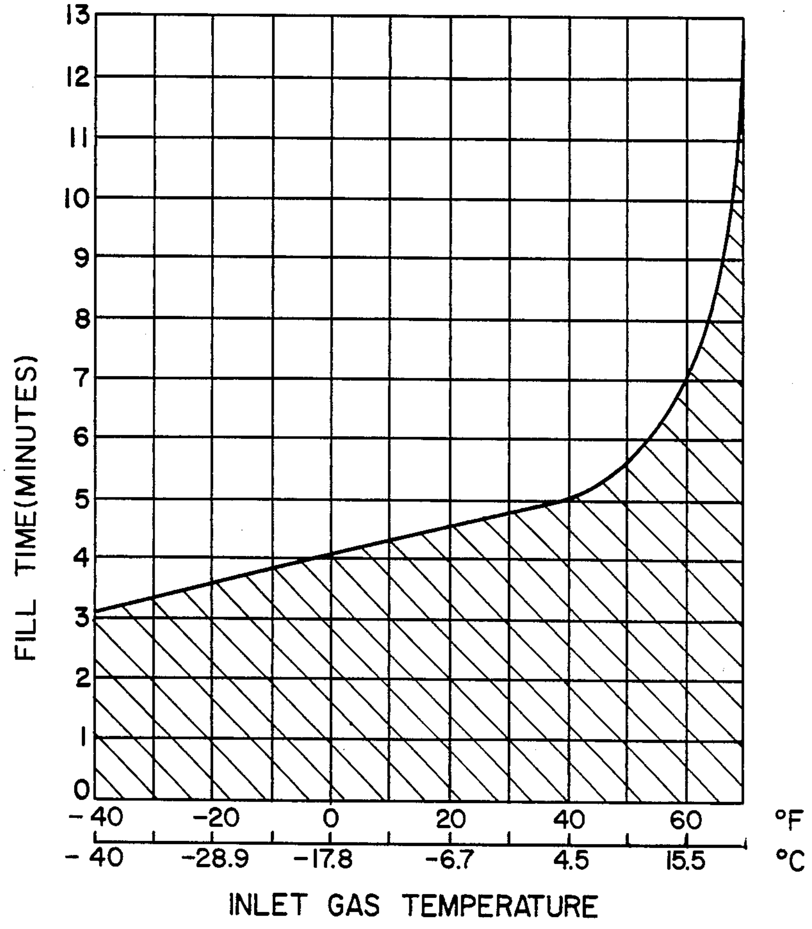
FIG. 6 is a graph plotting the relationship between inlet gas temperature and fill time.

Referring to FIG. 6, this illustrates in graphic form the effect the temperature of the inlet gas will have on the fill time under typical quick fill operations of this invention. The recirculation inlet gas temperature, which generally corresponds to the chiller operating temperature, will affect the time to fill the adsorbent filled gas storage cylinder through increasing or decreasing the average temperature affecting the driving force between the recirculation gas and the average bed temperature. The lower the inlet gas temperature the shorter the fill time, as shown in FIG. 6. This will generally provide a means of finer control of the fill time. Providing inlet gas at −17.8° C. instead of 4.5° C. will shorten the fill time from 5 minutes to 4 minutes. Thouqh this may require a higher capital investment for the chiller unit, this increase may be only a minor amount of the total equipment cost and may well be worth the investment if faster fill times are desired.

As is evident from applicant's teachings, the temperature of the inlet gas can vary widely from any temperature below ambient temperature. From a practical viewpoint, however, it is generally from about 10° C. to about −25° C.

The blower 12 is used to supply the energy required to circulate the gas through the cylinder and the heat rejection or cooling system. It is located downstream of the cylinder 7. The heat from the adsorbent bed is transferred to the gas and carried out with the natural gas stream. Part of the heat is rejected to about ambient atmospheric temperature through air cooled heat exchanger 13. This heat exchanger 13 is designed to operate at approximately a 5° C. to 10° C. approach to the ambient air. After the air cooled heat exchanger 13, the recirculated gas passes through a chiller 14 and is cooled down to about −20° C. to about 10° C. The chiller 14 cools the gas stream and provides an additional thermal driving force between the adsorbent and the natural gas recirculation stream, which greatly aids in the heat removal from the adsorbent bed. This decreases the filling time substantially. If the gas stream were not cooled below ambient the adsorbent bed could never be cooled to ambient temperatures. Since long periods of time defeat the purpose of a quick fill of a natural gas powered vehicle, the only other approach is to decrease the amount of fuel placed into the adsorbent filled cylinder. This in turn substantially decreases the range of the vehicle. Cooling the natural gas stream below ambient, results in reducing the fill time to about 5 to 10 minutes. The temperature to which the natural gas stream is cooled can be a variable used to fine-tune the fill time over a narrow range. The cooled natural gas stream results in the exiting gas temperature to be measurably higher than this inlet condition. This helps determine when to terminate the fill of the cylinder, as previously discussed.

The placement of the blower 12 in the recirculation loop involves a choice between the larger blower 12 size when placed downstream of the cylinder 7 but before the heat rejection equipment 13, 14 and the smaller blower 12 size but higher inlet 9 gas temperature when placed after the heat rejection equipment 13, 14. The small pressure rise across the blower 12 and blower inefficiency will result in a temperature rise of the discharged gas. This added heat has to be removed or it results in an extended fill time. Placement of the blower 12 before the heat rejection system 13, 14 places this heat load directly on the heat rejection system 13, 14 at the hiqhest possible temperature thus making it less costly to reject the added heat. The blower size or ACFM at this location is about 30% larger due to the 95° C. blower inlet gas temperature than if the blower was operated at a 4.5° C. blower inlet gas temperature. Placement of the blower 12 after the chiller 14 allows the blower 12 to operate at a lower temperature but results in the chiller 14 having to be sized to produce a lower temperature in order that the temperature after blower 12 is at the proper level. Assuming a 4.5° C. inlet 9 gas at the cylinder 7 is required, the chiller 14 would have to produce an outlet temperature of 3.3° C. The cost of producing this additional refrigeration at the lower temperature has to be balanced against the smaller size of blower 12. A compromise location may be to place the blower 12 after the air cooled heat exchanger unit 13 but before the chiller 14. This would result in an inlet 9 gas temperature of −1° C. or a 20% smaller blower 12 and rejecting the added heat at 4.5° C. condensing temperature, rather than reducing the condensing temperature.

In another embodiment of the system, the air cooled heat exchanger 13 could be eliminated. This would increase the heat load on the chiller 14 and increase the chiller 14 cost and power requirement. Since the air cooled heat exchanger 13 rejects most of the heat to ambient, its elimination will increase the chiller 14 size and its cost substantially.

A further embodiment could eliminate the chiller 14. The air cooled heat exchanger 13 size would then be increased to give closer approaches to the ambient air temperature. This would result in extension of the fill time from 5 minutes to possibly 15 minutes and also a reduction in the vehicle 8 range since cooling the adsorbent filled cylinder 7 to ambient temperatures cannot be reached.

What is claimed is:

1. A method for quick-fill placing a charge of natural gas into an adsorbent filled storage container carried by a compressed natural gas powered vehicle at elevated pressure and at approximately ambient temperature conditions including, bringing compressed gas into contact with the solid adsorbent in said storage container to effect adsorption of liquid gas on said solid adsorbent, withdrawing natural gas at a temperature elevated due to generated adiabatic heat of adsorption to a temperature above the original inlet gas temperatures, cooling the withgrawn natural gas by blower means through air cooled heat exchanger means and chiller means to a temperature below ambient temperature, recycling such cooled natural gas into contact with the solid adsorbent, and continuing said recycling and cooling to a stage that the average temperature of the adsorbed gas and the adsorbent bed in the container at elevated pressure is about the atmospheric ambient temperature.

2. The method of claim 1 wherein the temperature of the solid adsorbent is raised by the generated adiabatic heat of adsorption to from about 90° C. to about 250° C., the withdrawn natural gas is cooled to from about 5° C. to 10° C. of ambient temperature and then chilled to from about 10° C. to −25° C. and recycled to the solid adsorbent.

3. The method of claim 1 wherein the temperature of the natural gas entering the adsorbent filled storage container is from about 10° C. to about −25° C. and the temperature of the natural gas exiting from the adsorbent filled storage container is from about 35° C. to about 95° C. and the average pressure at ambient temperature in said storage container is about 500 psig.

4. Process for ascertaining the fill termination time in the charge of natural gas into an adsorbent filled storage container by the method claimed in claim 1, such process comprises terminating fill charging when the temperature of the natural gas exiting from the adsorbent filled storage container is from about 35° C. to 95° C.

5. An apparatus for placing a quick-fill charge of natural gas in a solid adsorbent in a storage container having gas inlet and gas outlet means, said container being carried by a compressed gas powered vehicle at about ambient temperature comprising:

(a) a source of natural gas;

(b) compressor means, purification means and storage means for compressing, purifying and storing natural gas passed from said source of natural gas;

(c) conduit means for passing said compressed and purified natural gas to the gas inlet means of said storage container;

(d) conduit means for passing said compressed and purified natural gas from the gas outlet means of said storge container, said natural gas having been adiabatically heated in said storage container;

(e) blower means for circulating said adiabatically heated natural gas passed from the storage container in said conduit means for downstream cooling, chilling and recycle to said storage container;

(f) cooling means adapted to receive and air cool said adiabatically heated natural gas circulated by said blower means to about ambient atmospheric temperature;

(g) chiller means fluidly connected to said cooling means and adapted to receive and chill the natural gas passed thereto from said cooling means from said temperature of about ambient atmospheric temperature reached in the cooling means to a temperature below ambient atmospheric temperature; and (h) conveyance means adapted to recycle said chilled natural gas at a temperature below ambient atmospheric temperature to said conduit means for passing compressed and purified natural gas to the gas inlet means of said storage container for recycle therein to said storage container.

6. The apparatus of claim 5 and including second chiller means positioned in said conduit means for passing compressed and purified natural gas to said gas inlet means of the storage container, said second chiller means being positioned downstream of said compression, purification and storage means.

7. An apparatus for placing a quick-fill charge of natural gas on a solid adsorbent in a storage container having gas inlet and gas outlet means, said container being carried by a compressed gas powered vehicle at about ambient temperature comprising:

(a) a source of natural gas;

(b) compressor means, purification means and storage means for compressing, purifying and storing natural gas passed from said source of natural gas;

(c) conduit means for passing said compressed and purified natural gas to the gas inlet means of said storage container;

(d) conduit means for passing said compressed and purified natural gas from the gas outlet means of said storage container, said gas having been adiabatically heated in said storage container;

(e) blower means for circulating said adiabatically heated natural gas passed from the storage container in said conduit means for downstream cooling and recycle to said storage container;

(f) cooling means adapted to receive and air cool said adiabatically heated natural gas circulated by said blower means to about ambient atmospheric temperature;

(g) conveyance means adapted to recycle said cooled natural gas at a temperature of about ambient atmospheric temperature to said conduit means for passing compressed and purified natural gas to the gas inlet means of said storage container for recycle therein to said storage container; and (h) chiller means positioned in said conduit means for passing compressed and purified natural gas to the gas inlet means of said storage container, said chiller means being positioned in said conduit means downstream of said compression means, purifcation means and storage means, and being adapted to chill the natural gas posed therethrough from a temperature of about ambient atmospheric temperature to a temperature below ambient atmospheric temperature.

* * * * *